United States Patent Office 3,318,733
Patented May 9, 1967

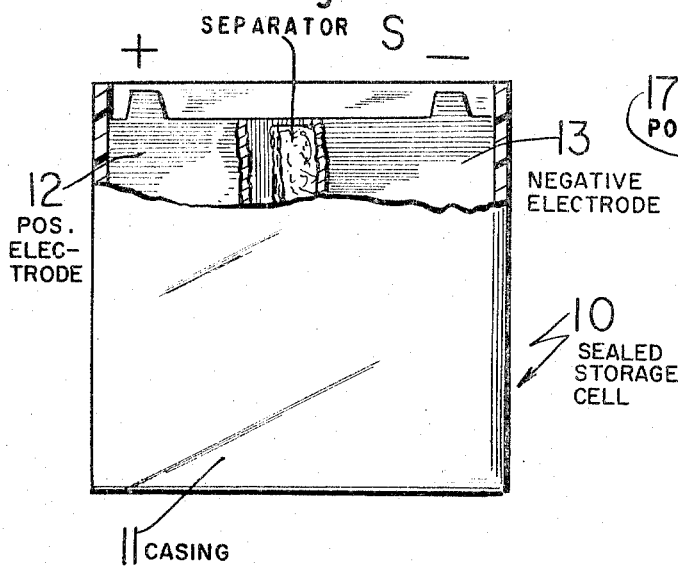
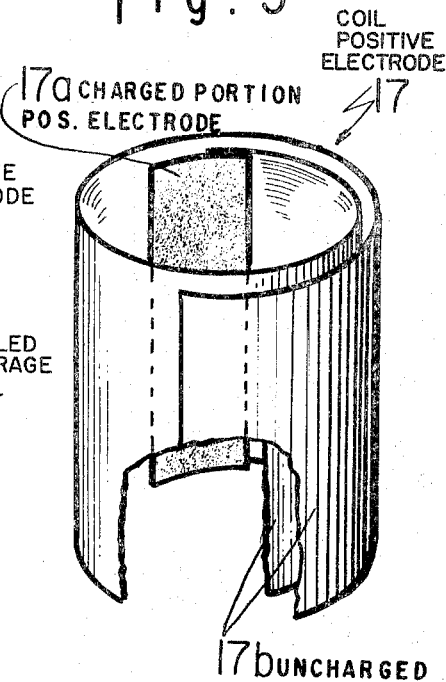
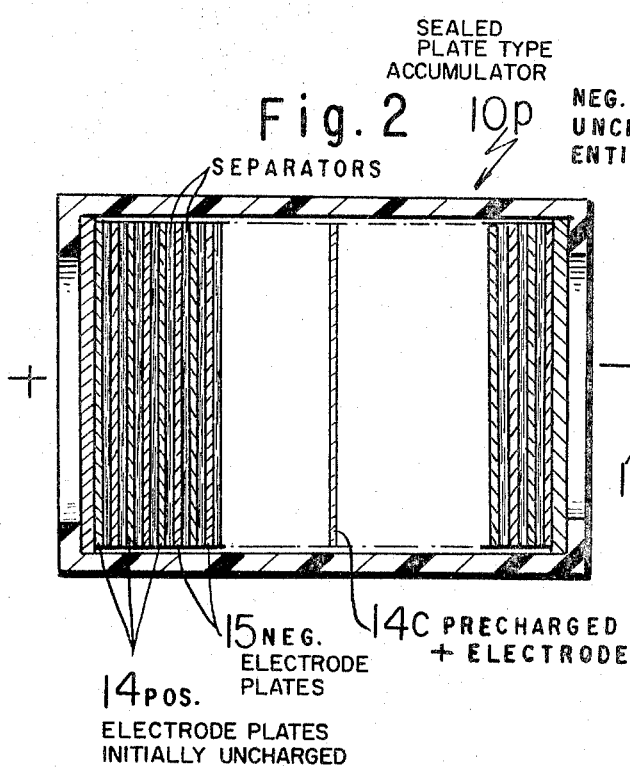

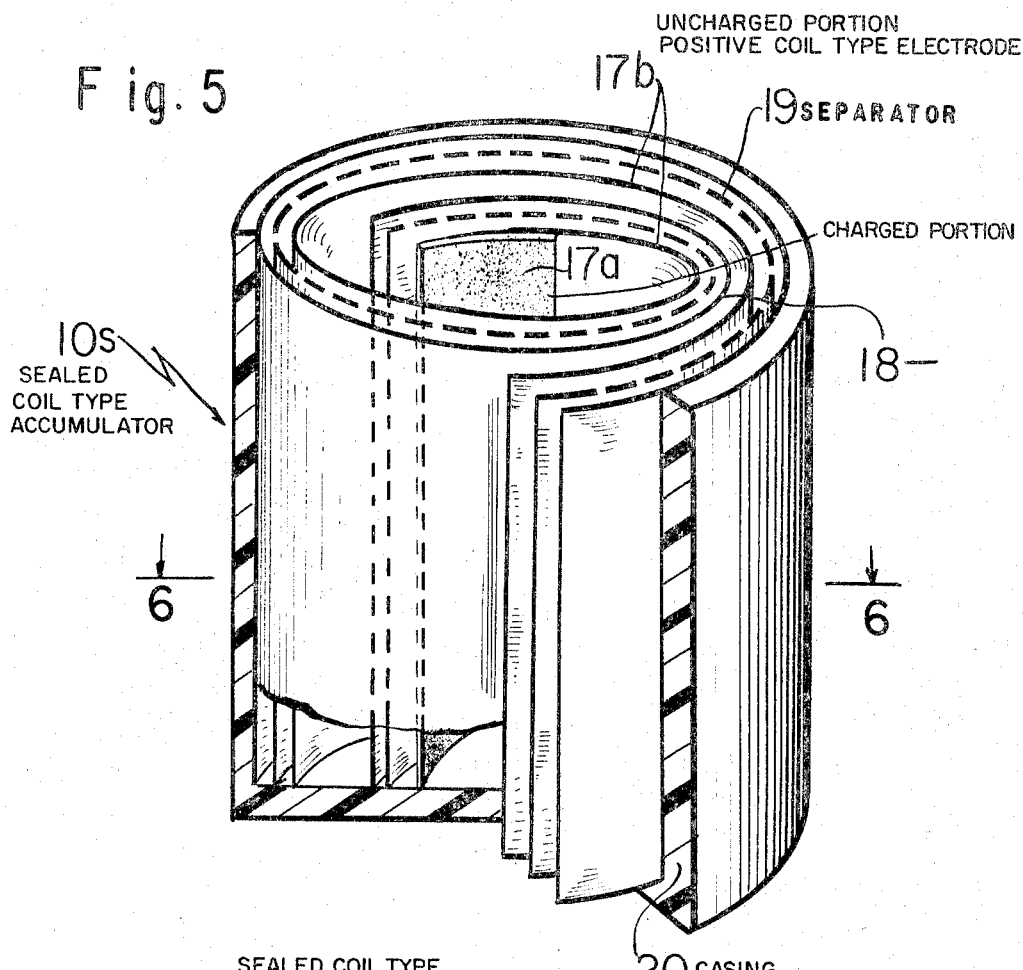
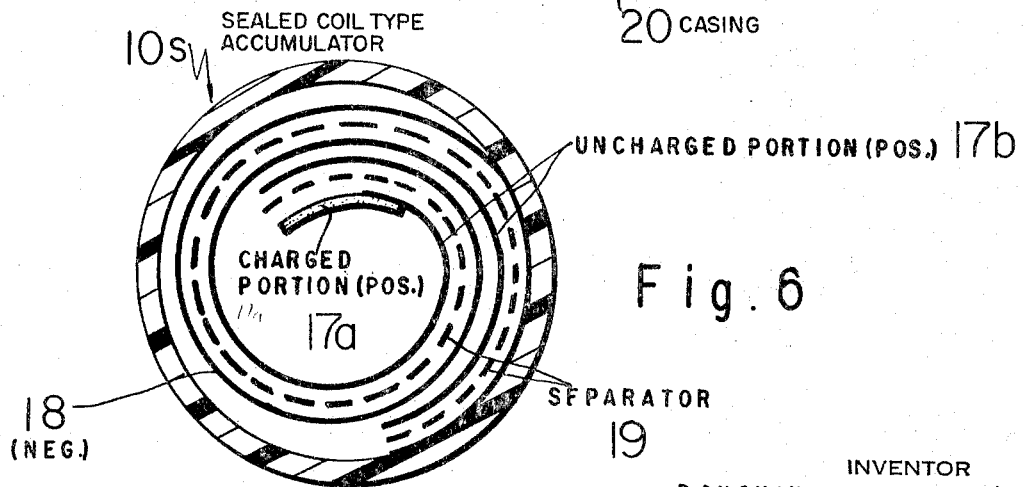

3,318,733
ELECTROLYTIC CELLS AND MORE ESPECIALLY IN GAS-TIGHT STORAGE CELLS OPERATING WITHOUT GAS-EVOLUTION
Douchan Stanimirovitch, Paris, France, assignor to Société des Accumulateurs Fixes et de Traction (Société Anonyme), Romainville, France, a company of France
Filed July 3, 1962, Ser. No. 207,180
Claims priority, application France, July 5, 1961, 867,026; June 5, 1962, 899,761
4 Claims. (Cl. 136—6)

The present invention relates to electrolytic cells and more especially to conventional alkaline, gas-tight storage cells or accumulators wherein the spacing between electrodes is small being of the order of 0.1 to 0.3 mm. or less and wherein preferably there is no free flowing electrolyte and a conventional excess of capacity of the negative electrode over that of the positive electrode exists.

Objects and features of the invention are the provision of cells and accumulators of the character mentioned wherein overcharge current can be substantially increased without the evolvement of a substantial amount of gaseous electrolysis products building a dangerous overpressure within the casing and whereby particularly the overcharge current may be doubled or even tripled as compared with previously known cells and accumulators of this character without development of any overpressure in such devices.

Further objects and features of the invention are the provision of novel structure and methods of assembling cells and accumulators of this character so that substantially greater overcharge currents as compared with conventional cells and accumulators may be supplied thereto without the development of dangerous overpressures therein.

Other objects and features of the invention will become apparent from the following specification and the accompanying drawings, wherein:

FIGURE 1 is a partially diagrammatic and partially broken-away elevational view of a sealed storage cell embodying the invention;

FIGURE 2 is a partially diagrammatic and partially sectional view of a plate type accumulator embodying the invention;

FIGURE 3 is a diagrammatic perspective view of a coil type positive electrode for use in a coil type form of sealed accumulator embodying the invention;

FIGURE 4 is a similar view of a coil-type negative electrode of said last-named form;

FIGURE 5 is a partially diagrammatic and partially broken-away perspective view of said last-named form of the invention; and FIGURE 6 is a partially diagrammatic transverse section taken along line 6—6 of FIGURE 5.

In a certain kind of electrolytic cells and more especially of gas-tight storage cells, due on the one hand to the small distance between the electrodes, distance which may be of about 0.2 mm. and less, and on the other hand to a suitable limitation of the current density (current at the end of the charge and during overcharge in the case of a storage cell), the oxygen forming at the anode never goes through the gas state but diffuses in the dissolved state in the electrolyte towards the cathode which is depolarized by said oxygen, thus preventing the evolution of hydrogen.

This process may probably be explained as follows although the invention is not tied to the scientific explanation of the phenomena which take place.

The oxygen is formed in the atomic state by the discharge of hydroxyl ions transferred to the anode, which, in contact with said anode, leave their electrons according to the following electrochemical reaction:

$$2OH \rightarrow H_2O + O + 2e$$

The oxygen atom O is then transformed into molecular oxygen $$2O \rightarrow O_2$$

This oxygen is probably formed in the dissolved state. This dissolution of oxygen is an equilibrium reaction. As soon as the concentration in dissolved oxygen goes beyond a certain limit, supporting that there is no supersaturation, oxygen first forms micro-bubbles then visible bubbles and rises from the solution in the gas form.

The concentration of the dissolved oxygen around the anode increases due to the fact that the hydroxyl ions discharge there and are transformed first as oxygen atoms and then, if not combined with the positive active material, as oxygen molecules. Thus is created a concentration gradient of dissolved oxygen between the anode and the cathodic compartment so that the oxygen diffuses towards the latter. The diffusion of dissolved oxygen takes place due to the concentration gradient, which is in accordance with Fick's laws of diffusion.

As soon as it reaches the cathodic compartment, the diffused oxygen is subjected to a partial reduction up to the state of perhydroxyl anion according to the well-known Berl process, according to which hydrogen peroxide can be prepared in the cathodic compartment of an electrolytic cell where the electrolyte is an alkaline solution.

Hydrogen peroxide thus formed is then decomposed according to an equilibrium reaction. The nascent oxygen in the atom state made in this decomposition depolarizes the negative electrode so that no hydrogen is evolved.

Thus we can see that there is an electrolysis without gas evolution due to certain subsidiary reactions in which the electrolysis products play a part due to the diffusion of oxygen. On the other hand, it is possible that the perhydroxyl anion is subjected to a further reduction giving a hydroxyl ion which in turn depolarizes the negative electrode.

This phenomenon has found a very important industrial application in cells and batteries of the type disclosed in Jeannin, U.S. Patent No. 2,646,455 (French Patent 1,029,709 and British Patent 715,903).

The reaction depolarizing the cathode by dissolved oxygen is usually a very slow reaction. In said patents, the rate is increased due to the fact that the electrodes are placed at a very small distance from each other, said distance being about 0.1–0.2 mm. In said patents, the inventor discloses the experimental fact, without attempting any scientific explanation, namely: that a notable recombination of the electrolysis products takes place if the electrodes are put very near each other, e.g. by pressure, the distance between two electrodes being materialized by a soft deformable separator, this phenomenon taking place with electrodes either impregnated with active materials, or without active materials.

The explanation of this experimentally verifiable phenomenon is what has been expounded above.

The smaller the distance is between the electrodes, the higher the rate of recombination of the electrolysis products. This is also in conformity with Fick's laws, since the amount of dissolved oxygen transferred by diffusion is proportional to the concentration gradient and the latter increases if the diffusion space decreases. However, it is difficult for practical reasons to decrease this space under certain limit, said limit being now of about 0.1 mm. There would be a risk of short-circuiting in closer spacing due to sharp surface irregularities of the electrodes.

Thus, there is a limit to the use of the means disclosed for the first time in the said patents due to the fact that the distance between the electrodes cannot in practice be made less than a certain limit because of the dangers of short-circuit.

As a result, from the work of the present applicant, it has been found that the rate of depolarizing the negative electrode by the dissolved oxygen may be substantially increased by giving to the partial pressure of oxygen in the cell, before the gas-tight closing or sealing of the envelope or casing of the cell, a higher value than that of the partial pressure of oxygen in air.

This improvement is a primary object of the present invention.

To put it in application it is for instance, possible to replace several times the atmosphere of the casing by oxygen before closing it in a gas-tight way, the oxygen introduced in the cell being either at the atmospheric pressure or under a different pressure.

In a gas-tight cell of the type herein described, this increase in the partial pressure of oxygen in the atmosphere of the casing, before the cell is put in operation, gives a particular effect. The cathode will be all the more efficiently depolarized, and as a consequence, the evolution of hydrogen will be all the more prevented, especially in a storage cell towards the end of the charge, as on the one hand the initial content of the electrolyte in dissolved oxygen is the higher and as on the other hand the amount of oxygen evolved by the flow of current, that the electrolyte can keep in solution to replace the oxygen consumed on the cathode, is greater.

In other words, the invention provides a means of promoting the process of depolarizing the cathode by dissolved oxygen, due to the increase in the amount of oxygen that the electrolyte can dissolve as well initially before any electrical functioning as during the flow of current.

The applicant has made the following fundamental tests:

An alkaline nickel-cadmium cell with thin sintered carrier electrodes according to the said U.S. Patent 2,646,655 was first charged, then put in overcharge with a current having an apparent density of 0.25 milliamp per square cm. for an average distance of 0.2 mm. between the electrodes of opposite polarities. It was found that this overcharge current, even during a long period of time, did not evolve any overpressure in the gas-tight casing of the storage cell. As the said casing had been closed in free air when the storage cell was manufactured, it must be supposed that the partial pressure of oxygen at the moment of closing was that of air, i.e. about 0.2 atmosphere.

An increase in the overcharge current density, e.g. by doubling it, has brought about in the casing an overpressure of several hundred grams/cm.$^2$.

An identical storage cell 10 with casing 11 in which the partial pressure of oxygen had been increased in the casing atmosphere before closing the latter, by several times replacing the casing atmosphere by pure oxygen at the atmospheric pressure, was then submitted to the same tests. It was found that the overcharge current could be substantially increased without any overpressure evolving in the casing. In this way, it is possible to double and even increase three times the overcharge current. This is a very important improvement.

In the case of a gas-tight nickel-cadmium storage cell 10 of the type hereinabove mentioned, with a distance between the electrodes 12, 13 of about 0.1 mm. and a pure oxygen atmosphere in the cell at the atmospheric pressure, it has been found that the current density after the charge had been completed (during overcharge), could be maintained at 1 milliamp per square centimeter, without any increase in the pressure of the cell. It even appeared as if this value of overcharge current could be increased.

It is well understood that the increase in the partial pressure of oxygen may also be applied in the case of the total pressure in the gas-tight casing being higher than the atmospheric pressure.

In order to manufacture the cells according to the invention, it is possible to use other ways of proceeding than that which consists in sweeping the inside of the casing by oxygen before closing it in a gas-tight way. It is possible, for instance, to finish the assembly and closing operations, which may advantageously be made automatic, in an atmosphere consisting of oxygen, or with an increased content of oxygen, the pressure of which may be regulated either at the atmospheric pressure value, or above this value. This way of operating is more especially advantageous for the storage cells of small dimensions of the so-called "button" type. It is also possible to effect the manufacturing operation of button cells under an oxygen stream, so that a slight overpressure may be obtained.

The foregoing description discloses more particularly an alkaline electrolyte sealed accumulator characterized by a distance between the electrodes of opposite polarity that is small enough so as not to produce any substantial passage of electrolysis products through the gaseous state, as well as by the existence, in the atmosphere of the sealed container 11 of the said accumulator 10, of a partial pressure of the oxygen exceeding that of the oxygen in the atmospheric air.

As a result of this increase in the partial pressure of the oxygen, the accumulator 10 is able to operate without practically any passage of electrolysis products through the gaseous state at relatively high charge or overcharge current densities that do, however, not exceed a certain limit dependent on the spacing of the electrodes 12, 13 of opposite polarity as well as on the partial pressure of the oxygen in the atmosphere of the sealed container. For example, in the case of a cadmium-nickel alkaline accumulator 10 having thin electrodes 12, 13 with a carrier material of sintered nickel, when the distance between electrodes of opposite polarity is on the average 0.1 mm. and the container atmosphere consists of oxygen that is pure at atmospheric pressure, one may maintain the overcharge current density at 1 ma./sq. cm. without noticing any pressure increase in the container 11.

Applicant has noted, however, that if, in a cadmium-nickel accumulator 10 according to the foregoing disclosure, the charge or overcharge current density is increased beyond this limit, the pressure prevailing within the accumulator 10 naturally increases, but is then maintained at a level that is independent of the duration of the application of the charge or overcharge current. If charging is halted, the pressure inside the accumulator 10 returns substantially to its initial level, especially where the negative electrode 12 consists of a sintered nickel support carrying the cadmium that forms the negative active material.

Thus, a kind of self-regulating adjustment occurs which one may try to explain as follows, it being well understood that this explanation is in no way limiting the invention.

It is well known that, in cadmium-nickel accumulators the release of oxygen at the positive electrode occurs prior to the release of hydrogen at the negative electrode. Thus, if the current density limit is exceeded at which the oxygen produced at the anode is maintained in the dissolved state in the electrolyte and diffuses toward the cathode compartment, a sudden release of oxygen occurs, raising the pressure inside the accumulator. This pressure increase promotes keeping in solution the oxygen which the anode continues to produce and diffusing it toward the cathode compartment; consequently, there will be no further release of gaseous oxygen or pressure increase as long as the current density is not being increased. If charging is halted, the overpressure inside the accumulator will gradually decrease as a result of the absorption and the secondary reactions that will occur in the cathode compartment through the dissolved oxygen which, in this instance, will come from the oxygen of the unoccupied spaces of the accumulator.

It goes without saying that this system can go on only if the charge and overcharge current density does not exceed a limit level which is, of course, superior to the limit level set forth in the foregoing description. Indeed, the consumption of oxygen in the cathode compartment, which is electrolytic in nature, cannot exceed a certain rate and it would be useless to try increasing further the amount of oxygen transferred by diffusion.

This limit value of the current density is not achieved in cases where the charge or overcharge current does not exceed, say C/10 a. or even C/8 a. in continuous operation, or up to C/5 a. for a limited period, C being the accumulator capacity expressed in ah. For such current densities, the cathode compartment is easily able to consume all of the oxygen produced at the anode; the oxygen pressure required for operation being below about 10 kg./sq. cm.

In accordance with a further embodiment of the invention, the accumulator container according to the first embodiment must be capable of withstanding an internal pressure dependent on the charge or overcharge current the accumulator has to withstand, this pressure being below 10 kg./sq. cm. in the case of a charge or overcharge current equivalent to C/5.

Also, a feature of the further embodiment is introducing oxygen in a combined form as is described in detail hereafter into the accumulator before it is tightly sealed.

The first-described embodiment provides for the introduction of the oxygen in the gaseous state in the unoccupied spaces of the container 11 before it is hermetically sealed. Applicant has noted that the effectiveness of this method is aleatory (that is, it cannot be ascertained whether two atmospheres originally introduced will remain or will be reduced to one atmosphere, for example, due to factors described below) due to the fact that the partial pressure of the oxygen which was increased at the time of closing of the sealed accumulator, diminishes in use and tends to disappear.

This is probably caused by secondary oxidation reactions as between the oxygen and separators, metal walls of the container, terminals, tabs, etc. Indeed, it must be pointed out that the quantity of oxygen required for achieving a certain oxygen overpressure is very small because modern accumulators have in general a very small unoccupied space. For instance, the unoccupied space of an accumulator having a 35 ah. capacity, built in accordance with the invention from thin sintered support electrodes and having a very thin separator, and in which the electrolyte required for the operation of the accumulator is fixed by capillarity in the electrode-separator block, is in the order of 30 to 50 cc.

Now, an oxygen volume of 30 cc. is (at atmospheric pressure) equivalent to 0.15 ah., representing about 1/200th of the capacity of the accumulator in question. This quantity is very small and one will note that it can easily be absorbed by the aforementioned secondary reactions.

In accordance with the further embodiment, oxygen is introduced into the accumulator, before it is hermetically sealed, in the combined form by providing an oxygen reserve in the positive electrode itself. To this end, measures are taken so that, upon assembly of the accumulator, a portion of the positive electrode is in the charged state, the balance of the positive electrode and the negative electrode being in the discharged state.

If the accumulator of the further embodiment is a plate accumulator 10p (FIG. 2), i.e. the positive electrode is made up of a set of flat positive plates 14, one plate 14c initially in the charged state and the others 14 uncharged is provided. The negative plates 15 in uncharged state are provided. Separators 16 between plates also are provided to achieve a spacing of between 0.1 and 0.2 mm.

To clarify, for an accumulator having, for instance, ten positive plates, nine positive plates 14 in the discharged and one 14c in the charged state, are provided, thus supplying an amount of oxygen equivalent to one-tenth of the accumulator's capacity. Ten negative plates 15 in uncharged state are also provided. This example shows to what extent the oxygen reserve has been increased compared to what it would be if it were in the gaseous form. This mode of providing additional oxygen is flexible in view of the fact that one may increase either the number of charged plates 14c or incompletely charge a single plate 14c if it is desired to have an oxygen reserve smaller than that corresponding to that of the charge of a single plate 14c.

It does, of course, not make any difference where the charged plate 14c is located. This plate 14c could be located either at the end or in the center of the set of positive plates 14.

In the case of an accumulator 10s (FIGS. 3-6), with coil positive and negative electrodes 17 and 18, one may consider making the positive electrode 17 in two sections, one 17a being in the charged or semi-charged state and the other one 17b being in the discharged state. Obviously, the two sections 17a and 17b are arranged in such a way that they will correspond to the overall capacity required from the positive electrode 17 and to the desired reserve of oxygen in cell 10s. Electrical contact between the two portions 17a and 17b of this positive electrode 17 may be achieved either by mere superpositioning, partially or completely (as shown) or by a suitable connection by means of a metallic conductor (not shown). The electrodes 17 and 18 and a separator 19 providing spacing of between 0.1 and 0.2 mm. between the electrodes are positioned in casing 20 with portion 17a and negative electrode 18 initially uncharged. After addition of the alkaline electrolyte, for example, potassium hydroxide, the casing is sealed and the electrodes are then charged.

Irrespective of the installation shape (flat or coil electrodes), it is well understood that the arrangement just described applies mainly to accumulators whose negative electrode 15 or 18 has a capacity exceeding by about 30% that of the positive 14 or 17; this, by the way, is the preferred design for all conventional alkaline accumulators, be they open or closed. It should also be well understood that the said arrangement applies only to those accumulators in which the electrodes of opposite polarity are spaced apart about 0.1 to 0.3 mm. The alkaline electrolyte, for example, potassium hydroxide, required for operating the accumulator is preferably fixed by capillarity in the electrode-separator block.

The oxygen reserve provided by the means forming the object of the said further embodiments offers two main advantages over the first-described methods of providing a reserve of gaseous oxygen that is placed into the unoccupied space of the accumulator.

As pointed out above, one of the advantages resides in the face that the oxygen reserve formed by a section 17a of the positive electrode in the charged state is by far superior to the reserve formable by the gaseous oxygen that may be gathered in a gaseous space without risking any prohibitive pressures.

A second advantage resides in the fact that the oxygen goes into action only when it becomes necessary to make its presence felt, that is, on overcharge. Indeed, as long as charge completion has not been achieved, the gaseous oxygen pressure plays no part and can under certain circumstances even be harmful by causing or promoting, during charge, gaseous diffusion currents in a direction counter to the current required to provide this charge.

While specific embodiments of the invention have been decribed, variations in practice, within the scope of the appended claims, are possible and are contemplated.

There is no intention, therefore, of limitation to the exact disclosure herein made.

What is claimed is:

1. A method of manufacturing a gas-tight secondary alkaline cell of the nickel-cadmium alkaline type which comprises placing in a container a positive nickel electrode and a negative cadmium electrode having an excess of negative active material as compared with the positive active material with a porous separator providing spacing between the electrodes lying between 0.1 and 0.3 mm., introducing alkaline electrolyte therein which is immobilized in the separator and introducing gaseous oxygen at a pressure of at least one atmosphere into the container prior to sealing and prior to charging the same to increase the partial pressure of the oxygen to at least one atmosphere and sealing the container and retaining therein said increased partial pressure of oxygen.

2. A secondary alkaline cell comprising a sealed container, a positive electrode, a negative electrode, said electrodes being of the thin sintered type containing active material in which the negative electrode has an excess of negative active material as compared with the active material of the positive electrode, an immobilized alkaline electrolyte in said cell, a porous separator between the electrodes providing a spacing of 0.1 to 0.3 mm. therebetween, said electrolyte being immobilized by capillarity in the separator and electrodes, said container having therein at the moment of sealing an atmosphere of substantially pure oxygen at a pressure of at least one atmosphere.

3. A method of manufacturing a gas-tight secondary alkaline cell of the nickel-cadmium alkaline type which comprises placing in a container a plurality of positive nickel electrode plates constituting one electrode wherein at least one but less than all of said plates are in a charged state, a plurality of negative cadmium plates in an uncharged state constituting the other electrode and having an excess of negative active material as compared with the positive active material with porous separator means between said positive and negative plates wherein the spacing between each of said plates is between about 0.1 and 0.3 mm., introducing alkaline electrolyte into said container which is immobilized in said separator means, introducing gaseous oxygen at a pressure of at least one atmosphere into the container prior to sealing and prior to charging the same, and sealing said cell.

4. A secondary alkaline cell of the nickel-cadmium alkaline type comprisng a sealed container, immobilized alkaline electrolyte therein, a positive nickel electrode comprising a plurality of plates at least one but less than all of which is in a charged state and the others are initially in an uncharged state, a negative cadmium electrode comprising a plurality of plates initially in an uncharged state and having an excess of negative active material as compared with the active material of the positive electrode, porous separator means between the electrodes providing a spacing between the plates of between about 0.1 and 0.3 mm., said container being sealed and having therein at the moment of sealing an atmosphere of substantially pure oxygen at a pressure of at least one atmosphere.

References Cited by the Examiner
UNITED STATES PATENTS

| | | | |
|---|---|---|---|
| 654,557 | 7/1900 | Tommasi | 136—46 |
| 2,642,469 | 6/1953 | Gary | 136—28 |
| 2,646,455 | 7/1953 | Jeannin | 136—24 |
| 2,862,989 | 12/1958 | Strauss | 136—161 |
| 2,951,106 | 8/1960 | Ruetschi | 136—28 |
| 3,031,517 | 4/1962 | Peters | 136—6 |
| 3,057,942 | 10/1962 | Smith et al. | 136—6 |
| 3,089,913 | 5/1963 | Garten et al. | 136—6 |

OTHER REFERENCES

Deh Melt—"Elektrotechnische Zeitschrift"—Jan. 11, 1960, (Gas Dichte Nickel-Kadmium-Akkumulatoren) pp. 7–9.

Vinal, Storage Batteries, 4th edition, 1955, p. 166.

WINSTON A. DOUGLAS, *Primary Examiner.*

JOHN R. SPECK, MURRAY TILLMAN, JOHN H. MACK, *Examiners.*

B. J. OHLENDORF, A. SKAPARS, *Assistant Examiners.*